May 2, 1961 J. L. HAM 2,982,844
PRODUCTION OF METALS
Filed Jan. 7, 1957 3 Sheets-Sheet 1

INVENTOR.
John L. Ham
BY
Oliver W. Hoeyes
ATTORNEY

INVENTOR.
John L. Ham
ATTORNEY

May 2, 1961 J. L. HAM 2,982,844
PRODUCTION OF METALS
Filed Jan. 7, 1957 3 Sheets-Sheet 3

*INVENTOR.*
John L. Ham
BY
Oliver W. Hayes
ATTORNEY

United States Patent Office 2,982,844
Patented May 2, 1961

2,982,844
PRODUCTION OF METALS

John L. Ham, Wellesley Hills, Mass., assignor to National Research Corporation, Cambridge, Mass., a corporation of Massachusetts Filed Jan. 7, 1957, Ser. No. 632,729

12 Claims. (Cl. 219—76)

This invention relates to electric arc melting and sintering of refractory metals such as zirconium and titanium. More specifically this invention relates to the welding or sintering of particulate refractory metal to form consumable electrodes for use in arc melting furnaces.

One of the most common methods used for producing useful forms of refractory metals is the method of arc melting in which part or all of the charge is admitted to the furnace in the form of a consumable electrode which is melted in the process. As the demand for the fabricated metal has increased, it has been found necessary to develop furnaces with larger capacity. As the size of the furnaces is increased it is desirable to increase the size of the consumable electrodes used therein. Means for producing such large electrodes have heretofore been very expensive and difficult to control.

One object of this invention is to provide a simple, economical method for producing such electrodes.

Another object of this invention is to form a consumable electrode by electric arc means using a relatively small amount of electric power.

Another object of this invention is to provide a means to outgas the metal before final melting.

A further object of this invention is to provide an apparatus to utilize the above method.

Difficulty has been experienced in providing finished ingots of homogeneous refractory metal alloys. The difficulty is attributed to the failure to add a constant amount of alloying metal in an even distribution to each unit of refractory metal charge being melted.

It has been found that segragation results between the refractory metal and the alloying metal when the metals are mixed together as charges. This is true especially where the particulate sizes of the refractory metal and the alloying metals are not the same, and where there is a great difference between the density of the refractory metal and the alloying metal.

Where a consumable electrode of refractory metal has been utilized in melting with the separate addition of particulate alloying metals, the rate of addition has been difficult to regulate.

Where the alloy is distributed uniformly along the length of the axis of a consumable electrode, it is found that a very homogeneous final ingot is produced. This distribution has previously been effected by longitudinally drilling the consumable electrode and filling the hole with alloying metal. Due to the physical properties of refractory metals, this method has involved high drilling costs.

Another object of this invention, therefore, is to provide an economical method to produce a consumable electrode with a uniform lengthwise distribution of alloy material.

These and many other objects of the invention are evident from the drawings, specification and claims.

It has been found that particles of metal such as titanium sponge will fuse together in a cohesive mass when thin layers of the particles are subjected to an electric arc. Because only the outer surface of the particles need be melted to effect this fusing of particles, it is possible to form the electrode with much less electrical power than would be necessary to melt the metal completely. During this fusing operation it is possible to drive off much of the gas in the metal sponge by means of operation under vacuum.

The objects of this invention are realized by utilizing the method of welding or sintering the sponge or other comminuted or particulate forms of refractory or other metals in progressive layers within a chamber filled with an inert gas or containing a vacuum, thus building up a consumable electrode.

For a fuller understanding of the nature and objects of the invention, reference should be had to the following detailed description taken in connection with the accompanying drawings wherein.

Figure 1:
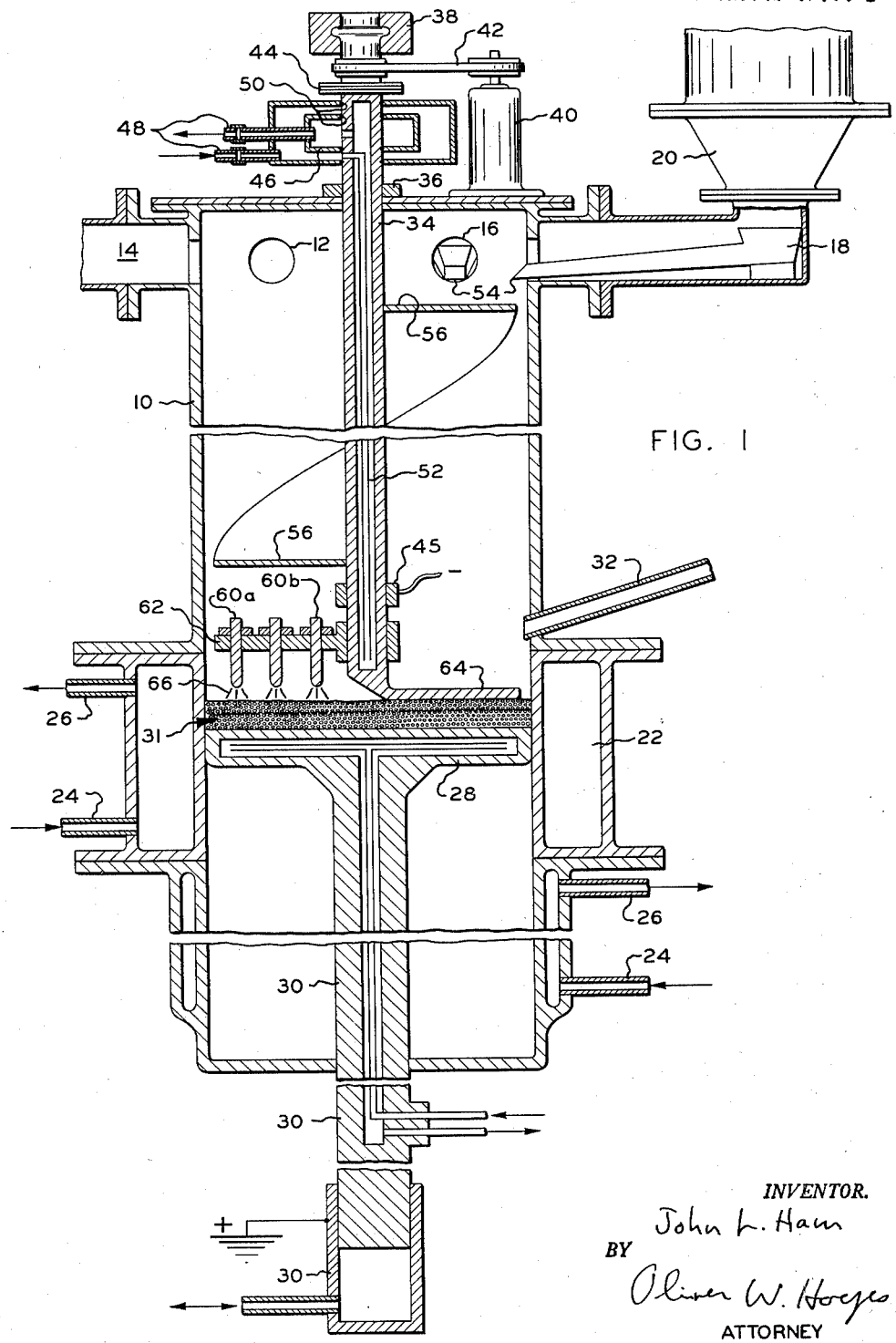
Fig. 1 is a digrammatic, schematic elevation of one preferred embodiment of the invention.

In general the invention relates to a method of fabricating consumable electrodes by progressively providing and sintering or superficially fusing layers of particulate or comminuted metals in a vacuum furnace and to apparatus utilizing this method.

One preferred embodiment of this invention utilizes a "cold mold" as the chamber provided for the formation of the consumable electrode or ingot. "Cold mold" when used in this context refers to a receptacle with coolant passages provided in its vertical walls through which a liquid coolant is forced during the electrode-forming operation. By utilization of this mold it is possible to conduct high temperature operations therein without melting the walls which contain the operation.

In one embodiment of this invention a plurality of sintering electrodes are rotated around the top surface of the forming consumable electrode or ingot. A specific design of this type consists of a vertical drive shaft extending into the consumable electrode forming chamber to which the holder of the sintering electrodes is radially attached. Rotation of this shaft rotates the sintering electrodes. To coordinate the spreading of a layer of particulate metal to be welded or sintered with the rotating sintering electrodes, a spreading means is attached to the driving shaft. One means of doing this is to affix a helical strip of metal sheeting or similar material to the shaft. The feeding means delivers the metal charge to the furnace above the helix. The metal charge falls upon the helix and slides down and around to the end of the helix. The end of the helix extends radially from the driving shaft, and thus spreads a new layer of metal particles as the electrodes rotate sintering or welding the preceding layer. Another means of effecting such coordination is to provide a funnel-like hopper around the shaft with the vertical axis of the shaft being that also of the hopper. The bottom of the hopper projects radially from the shaft to one side only and turns with the shaft. The feeding means is located over the hopper and feeds particles to it. The hopper deflects the particles to the bottom of the hopper where they are directed in radial distribution to the top of the consumable electrode being formed. Other methods for effectively spreading the particles progressively around the top of the consumable electrode can be utilized within the scope of this invention. An added element to this apparatus consists of a bar or rake protruding radially from the vertical shaft and in contact with the freshly delivered metal particles. As the drive shaft rotates, the bar smooths and packs the particles. This element is especially useful in welding or sintering where the particular operating conditions give rise to excessive spattering. A level surface minimizes the spattering.

Preferred embodiments of this invention utilize a single electrically conductive holder to which all of the sintering electrodes are firmly and electrically attached. In order to subject the particulate metal near the periphery of the forming consumable electrode to an arc intensity at least as great as the intensity near the center, a wedge-shaped holder with greater area adjacent the periphery is provided. This permits a concentration of sintering electrodes near the periphery. In vacuum operation another means of accomplishing the same result is by providing sintering electrodes with high electron emission rate in vacuum, such as those of thoriated tungsten, adjacent the periphery and by providing sintering electrodes of lower electron emission rate in vacuum, such as those of tungsten, nearer the center.

An advantage is derived in having adjacent sintering electrodes spaced close together. In such a space relationship the arcs are mutually self-sustaining. If the arc of one sintering electrode in such an arrangement is for some reason extinguished, the arc will be regenerated merely by the proximate arcing sintering electrodes by virtue of the streams of ions engulfing the extinguished sintering electrode. By such arrangement continuous operation is better assured.

Titanium metal, being representative of the refractory metals to which this invention relates, is referred to in the following description. It should be understood that other refractory metals may be utilized where the description refers to titanium.

Referring now to Fig. 1, there is illustrated one specific preferred embodiment of the invention outlined above. In this illustrated embodiment there is a vacuum furnace 10, provided with a vacuum-pump suction port 12 through which the air is evacuated, and an inert gas port 14, through which inert gas such as argon can be introduced if desired. The alloying constituents and the titanium charge are introduced to the furnace by means of electrically controlled vibrating feeders, 16 and 18 respectively, which are located below and in connection with storage hoppers as illustrated by the titanium hopper 20. Where it is desired to feed more than one alloying constituent separately, more feeders are provided. A cold mold 22 is provided, made preferably of copper, to which water is introduced at 24 and withdrawn at 26. A retractable water-cooled stool 28, actuated by some suitable means, preferably by a hydraulic lift 30, forms the bottom of the furnace. A consumable electrode 31 is formed upon the stool 28 in the manner described below. Means for observing the forming operation are provided as indicated by the telescope 32.

A water-cooled drive shaft 34 extends vertically into the furnace passing through an insulated vacuum-tight journal and seal 36 in the furnace roof. The drive shaft 34 is supported by a thrust bearing 38, which in turn is supported by a yoke (not shown) extending up from the furnace roof. A variable speed, direct current motor 40 turns the drive shaft by means of sprockets and chain 42. An insulated flanged coupling 44 isolates from the remainder of the drive shaft the portion of the drive shaft which is energized by an energized graphite block 45. A cooling water transfer block 46 provides coolant to the drive shaft. Coolant connections 48 to the block 46 are of suitable insulating material, preferably rubber hose. Annular seals 50 around the shaft prevent leakage. Coolant passages 52 extend vertically through the drive shaft 34.

Attached to the drive shaft 34 beneath the vibrating feeder chute discharges 54 is a helical deflector or spreader 56, provided with a sufficient slope that the charge deposited on the upper surface of the helix will slide down in a circular motion upon the helix. The spreader is so designed as to deposit the charge progressively upon the top surface of the forming consumable electrode or ingot 31 as the drive shaft rotates.

A number of sintering electrodes 60a and 60b are clamped to an electrically conductive electrode holder 62 which is attached to the energized drive shaft 34. The sintering electrodes 60a adjacent the periphery of the forming consumable electrode 31 are of a material with a greater arc capacity (electron emission rate) at a given voltage than those sintering electrodes 60b nearer the center.

A leveler bar 64, with a refractory insulating sleeve made preferably of zircon, is affixed to the end of the drive shaft 34. As the vibrating feeders 16 and 18 feed the charge of metal particles to the spreader 56 and the shaft 34 is rotated, the charge from the spreader 56 falls upon the top surface of the forming consumable electrode 31 in a substantially radially uniform layer. The leveler bar 64 smooths the layer of charge as the leveler bar is turned by the shaft 34 in circular motion. The sintering electrodes 60a and 60b then pass over the smoothed charge. Arcs 66 are maintained between the sintering electrodes and the charge. The speed of rotation, the charge rate and the power supplied to the sintering electrodes are all controlled to provide a welded mass (not completely melted), sufficiently bound together to serve as a consumable electrode for further processing. As the consumable electrode 31 forms, the stool 28 retracts from the mold 22, drawing with it the consumable electrode.

Figure 2:
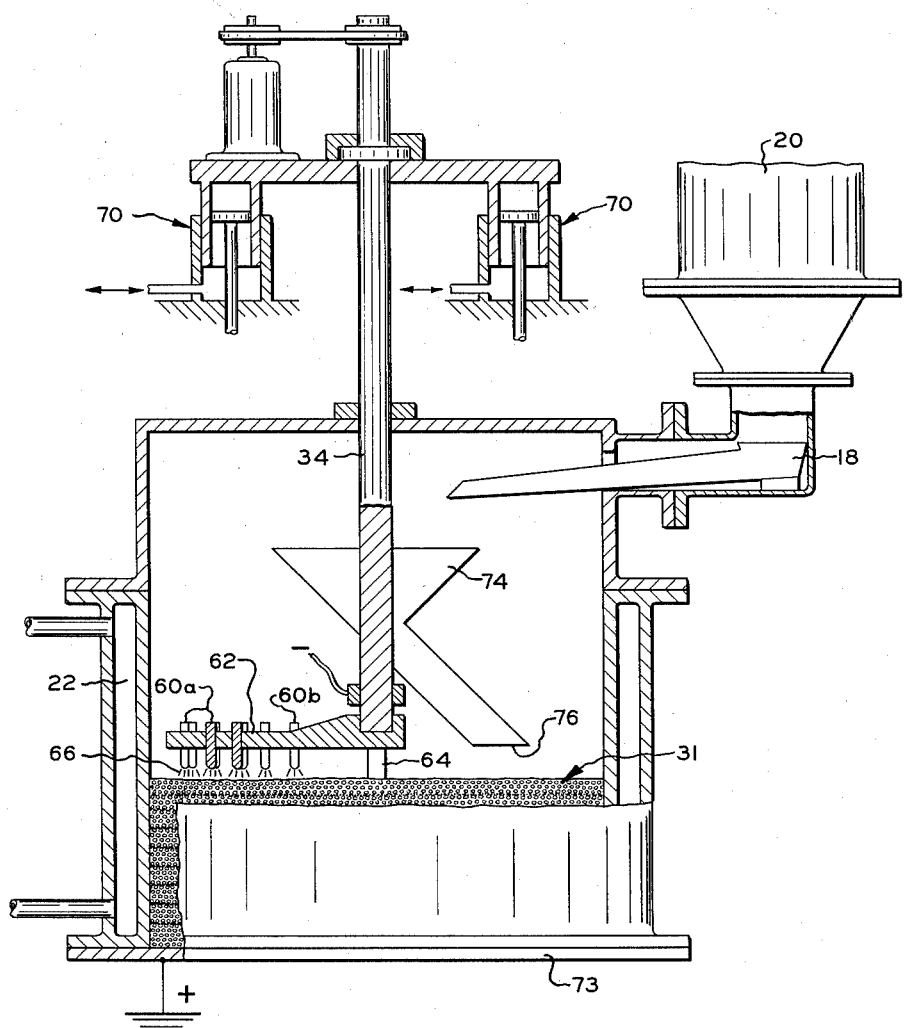
Fig. 2 is a diagrammatic schematic elevation of another preferred embodiment of the invention.

In Fig. 2 another embodiment of the invention is shown. In that embodiment a vertical drive mechanism 70 is provided to raise and lower the drive shaft 34. By so moving the drive shaft, the leveler bar 64, the electrode holder 62 with the affixed sintering electrodes 60a and 60b together with all other elements attached to the drive shaft 34 are withdrawn from the mold 22 as the consumable electrode 31 is formed. Upon completion of the operation a fixed stool 73 is removed and the consumable electrode 31 is withdrawn. A funnel spreading means 74 is attached to the drive shaft 34 with the lower opening 76 of the funnel spreading means 74 extending radially from the drive shaft 34. The sintering electrodes 60a near the periphery of the forming consumable electrode 21 are more numerous than the sintering electrodes 60b near the center. By this means the power input to the surface of the ingot 31 adjacent the periphery as imparted by arcs from sintering electrodes 60a is of greater intensity than that imparted by arcs from sintering electrodes 60b near the center.

Figure 3:
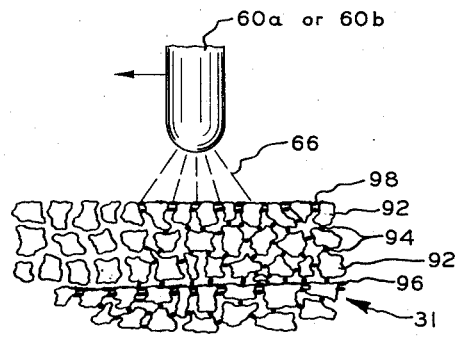
Fig. 3 is an enlarged cross-sectional view of a portion of the forming consumable electrode.

Fig. 3 is an enlarged cross-sectional view of a portion of the forming consumable electrode 21. Particulate metal 92 directed to the top surface of the forming consumable electrode 31 after leveling is sintered and welded together as shown at 94 by electrodes 60a and 60b and is welded to the portion of the consumable electrode 31 previously formed as shown at 96. A surface 98 of particles thereby welded together is then ready to receive another layer of particulate metal as the drive shaft rotates. By this method the consumable electrode or ingot is formed.

Figure 4:
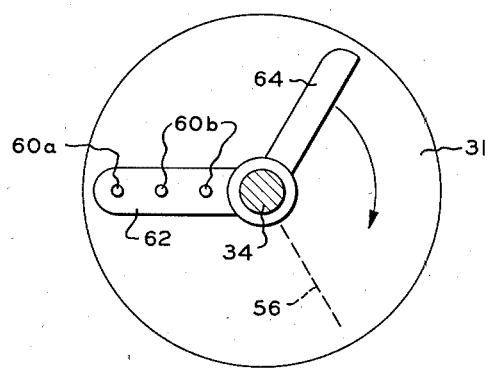
Fig. 4 is a schematic view of the preferred arrangement of elements of the apparatus.

Fig. 4 schematically indicates the arrangement of elements attached to drive shaft 34. These elements are the leveling means 64, the electrode holder 62, the sintering electrodes 60a and 60b and the edge of the spreading means 56.

Figure 5:
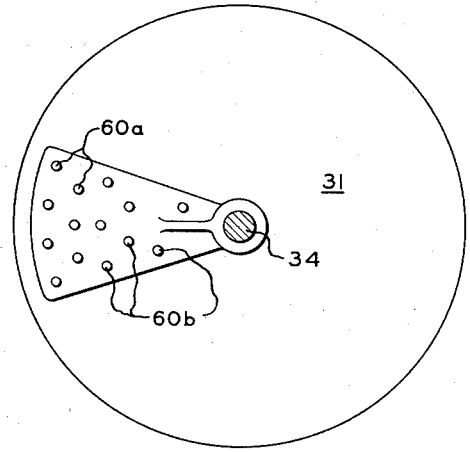
Fig. 5 is a schematic plan view of one preferred electrode holder.

Fig. 5 indicates one embodiment of the electrode holder 62 wherein there are more sintering electrodes 60a near the periphery of the consumable electrode 31 being formed than there are near the center of the consumable electrode. By this arrangement a desired power distribution can be effected.

This invention is not restricted to production of forms from titanium but is applicable to all refractory metals among which are vanadium, chromium, zirconium, columbibum, molybdenum, hafnium, tantalum, tungsten and uranium. It is also applicable to the production of forms from mixtures of metals such as mixtures of refractory metals of mixtures of refractory metal with other metals.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An apparatus for forming consumable electrodes of metal for subsequent melting in a consumable electrode arc-melting furnace, said apparatus comprising means defining an air tight welding chamber, means for feeding particulate metal to the upper surface of a forming consumable electrode within said welding chamber, means for spreading the fed particulate metal in a uniform layer across the upper surface of the forming consumable electrode, a plurality of electrodes spaced radially with respect to the axis of the consumable electrode, means for creating an arc between said electrodes and the adjacent layer of particulate metal, and means for rotating the electrodes around the axis of the consumable electrode to sinter the layer of spread particulate metal to the upper surface of the consumable electrode and thereby form a new upper surface onto which another layer of particulate metal can be spread and sintered.

2. An apparatus for forming consumable electrodes of metal for subsequent melting in a consumable electrode arc-melting furnace, said apparatus comprising means defining an air tight chamber, means for feeding particulate metal at a controlled rate into said chamber to the top of a forming consumable electrode, leveling means in contact with the particulate metal on the top of the forming consumable electrode, means providing relative movement between the particulate metal upon the top surface and the leveling means to level the particulate metal on the top surface of the forming consumable electrode, electrode means located above the top surface of the forming consumable electrode, means for creating an arc between the electrode means and the leveled layer of particulate metal on the top surface to weld particles of the metal to each other and to the top of the forming consumable electrode to create a surface upon which another layer of particulate metal can be spread, means for imparting relative horizontal movement between the electrode means and the leveled particulate metal thus enabling the welding of all the particles on the top of the forming consumable electrode, and means to impart relative vertical movement between the electrode means and said forming consumable electrode to provide clearance between the forming consumable electrode and the electrode means.

3. An apparatus for forming ingots of metal for use as consumable electrodes for subsequent melting in a consumable electrode arc-melting furnace, the apparatus comprising an air tight furnace means, the lower portion of said furnace means comprising an ingot forming chamber, the cross-section of said ingot forming chamber being substantially the same as the cross-section of the ingot desired, an air tight means for storing the particulate metal to be formed into ingot, an air tight feeding means cooperating with the storage means to feed the particulate metal from the storage means into the furnace means at a position above the ingot forming chamber, a deflector means located in said furnace between the outlet of the feeding means and the ingot forming chamber, the deflector means cooperating with the outlet to deflect the particulate metal from the path of free fall from the outlet to the ingot forming chamber, moving means for said deflector to progressively deflect the particulate metal uniformly across the cross-section of the ingot forming chamber upon the top surface of an ingot being formed therein, a leveling means cooperating with the deflector means to provide by a scraping action a uniform surface of the particulate metal on the top of the forming ingot in the ingot forming chamber, an electrode means located between the deflector means and the leveled particulate metal on the top of the forming ingot, means for creating an electric arc between said electrode means and the level particulate metal, an electrode moving means cooperating with the leveling means to cause the electrode arc to progressively weld the level particulate metal as the leveling means levels the metal thus providing a new top surface upon which another layer of particulate metal can be spread and welded, and means for providing relative vertical movement between the forming ingot and both the electrode means and leveling means to provide constant clearance between the ingot and both the electrode means and leveling means.

4. In a cold mold air-tight furnace for forming large consumable electrodes from comminuted refractory metal such as titanium, the apparatus comprising a means for feeding comminuted metal to the cold mold, the combination of a leveling means which cooperates with the feeding means to provide by scraping action a level surface of comminuted metal on the top of an ingot being formed in the cold mold, and an electrode means, said leveling means and electrode means being affixed to a rotating shaft means extending along the vertical axis of and into the cold mold, means for providing relative vertical movement between the leveling means and electrode means and the ingot being formed in the cold mold, and means to create an arc between said electrode means and the comminuted metal to progressively sinter the level comminuted metal to the ingot being formed.

5. The apparatus defined in claim 4 wherein the electrode means comprises a plurality of electrodes mounted on a solid conductor bar firmly and electrically attached to the rotating shaft means and protruding radially therefrom and the leveling means is a bar coated with a refractory coating to prevent electrical current flow from the leveling bar means to the comminuted metal being leveled.

6. In a high temperature air tight furnace for the building up of an ingot of metal by welding, comprising a chamber to contain the forming ingot, a means for controlling the atmosphere within the chamber, a means for delivering a charge of particulated metal to be welded from a storage means to the chamber, and the combination comprising a metallic holder for electrodes, a plurality of electrodes attached to the holder, a rotatable shaft to which the holder is radially attached provided to rotate the holder and the electrodes attached thereto around the top of the ingot in the chamber, said shaft extending vertically into the chamber, means to rotate the shaft at the upper end, electrical conducting means to energize the electrodes, means to receive the charge of particulated metal and to progressively distribute the charge upon the top of the forming ingot chamber in cooperation with and in a relation in rotation ahead of the rotating electrodes, means cooperating with the charge distribution means and electrode holding means to level the charge on the top of the ingot by a scraping action, said leveling means being in displacement in rotation following the fall of the distributed charge and ahead of the rotating electrodes which weld the particles of metal to each other and to the top of the ingot without completely melting the particles, and means for providing relative vertical movement between the electrode holder and the forming ingot to maintain clearance between the holder and the ingot.

7. A furnace apparatus for welding particulated metal into a cohesive ingot for use as a consumable electrode in a vacuum furnace, the apparatus comprising an air tight outer shell, an inner vertical chamber containing a forming ingot, said chamber being made of metal with high heat conductance, fluid cooling passages surrounding the vertical chamber provided to cool the chamber, means for controlling the atmosphere within said chamber, means for storing metal to be welded, means to introduce a charge of the metal into said chamber at a controlled rate from the storage means, means to progressively distribute the charge into said chamber in a circular, sector sweeping motion onto the top surface of the forming ingot, a shaft means rotatably supported directly above said chamber and extending into said chamber, said shaft supporting an electrically conductive electrode holding means and connected electrically thereto, means supplying electrical energy to the lower portion of the shaft means, the electrically conductive holding means holding in electrical contact an electrode means and rotating the electrode means in a sector sweeping motion at the same rate the charge is distributed so as to weld together the particles of the charge thus distributed, electrical insulating means isolating the lower portion of the shaft means, driving means for rotating the shaft means, and vertical moving means providing relative vertical motion between the shaft with the aforesaid elements attached thereto and the ingot being formed to provide adequate space for the forming ingot.

8. The apparatus in claim 7 wherein the vertical moving means is a retractable stool in the vertical chamber provided to withdraw the ingot as the latter is formed.

9. The apparatus in claim 7 wherein the vertical moving means is a means to withdraw the shaft means progressively from the vertical chamber as the ingot is formed.

10. The apparatus defined in claim 7 wherein the charge distributing means comprises the combination of a helical surface of at least one turn fixed to the shaft means, and a leveler bar attached to the shaft means, said leveler bar being electrically isolated from the ingot being formed by a suitable refractory coating, the leveler means following, in rotation, the distributed charge, and leveling same by virtue of relative sliding motion between the leveler bar and the distributed charge.

11. The apparatus defined in claim 7 wherein the means provided to progressively distribute the charge into the inner vertical chamber is a funnel attached to the drive shaft and rotating therewith, the lower opening of the funnel being extended radially from the drive shaft.

12. In a cold mold, retractable stool, vacuum furnace for the production of forms from refractory metals, the combination welding means comprising a rotatably supported vertical shaft means extending into the furnace down into a cold mold, means to rotate the shaft means, a charge delivering means delivering particulated refractory metal charge to the furnace, a helical deflector attached to the upper part of the shaft means in the furnace, and provided to receive the charge from the delivery means and rotatably distribute the charge upon the top of an ingot being formed in the cold mold, a copper electrode holder means firmly and electrically connected to the lower end of the shaft means and extending radially therefrom, said copper electrode holder being displaced ahead of the lower helical distributing means outlet in the direction of rotation, an insulated scraping means provided to level the charge upon the top of the forming ingot, said scraping means being connected to the shaft means at its lowest end and extending radially therefrom, said scraping means being angularly displaced ahead of the electrode holder means and behind the helical distributing means in the direction of rotation, an electrode means attached firmly and electrically to the copper electrode holding means, an electrical connection means supplying electrical power to the shaft means, and an electrical connection means attached to the retractable stool for providing an electrical potential opposite to that of the electrodes to the ingot being formed to create an arc between the moving electrode means and the level charge.

References Cited in the file of this patent
UNITED STATES PATENTS

| | | |
|---|---|---|
| 2,124,262 | Samuelson et al. | July 19, 1938 |
| 2,541,764 | Herres et al. | Feb. 13, 1951 |
| 2,727,936 | Boyer | Dec. 20, 1955 |
| 2,782,114 | Preston | Feb. 19, 1957 |
| 2,800,519 | Garmy | July 23, 1957 |
| 2,826,492 | Morash | Mar. 11, 1958 |